(12) United States Patent
Chou

(10) Patent No.: US 9,279,998 B2
(45) Date of Patent: Mar. 8, 2016

(54) ASSEMBLY STRUCTURE FOR EYEGLASS LENS

(71) Applicant: HSIEN CHANG OPTICAL INDUSTRIAL CO., LTD., Tainan (TW)

(72) Inventor: Wen-Hsiung Chou, Tainan (TW)

(73) Assignee: Hsien Chang Optical Industrial Co., Ltd., Tainan (TW)

( * ) Notice: Subject to any disclaimer, the term of this patent is extended or adjusted under 35 U.S.C. 154(b) by 0 days.

(21) Appl. No.: 14/182,473

(22) Filed: Feb. 18, 2014

(65) Prior Publication Data

US 2015/0234200 A1    Aug. 20, 2015

(51) Int. Cl.
*G02C 1/04*    (2006.01)
(52) U.S. Cl.
CPC .............. *G02C 1/04* (2013.01); *G02C 2200/04* (2013.01); *G02C 2200/08* (2013.01)
(58) Field of Classification Search
CPC ............ G02C 1/04; G02C 1/10; G02C 5/008; G02C 7/00; G02C 7/02; G02C 9/04; G02C 13/00; G02C 2200/04; G02C 2200/06; G02C 2200/08

USPC ........................ 351/103–109, 140, 154, 178
See application file for complete search history.

(56) References Cited

U.S. PATENT DOCUMENTS 6,386,704 B1 * 5/2002 Wu .......................... G02C 1/04
                                                          351/106
6,561,647 B1 * 5/2003 Chen ............................ 351/103

FOREIGN PATENT DOCUMENTS

TW        M377605 U1     4/2010
TW        M417563        12/2011

* cited by examiner

*Primary Examiner* — Huy K Mai
(74) *Attorney, Agent, or Firm* — Rosenberg, Klein & Lee

(57) ABSTRACT

An assembly structure for eyeglass lens is disclosed herein to include a one-piece lens and a frame. The frame has a connection portion in the middle thereof, from two sides of which two nose pads extend downwardly and obliquely in two opposite directions. The connection portion has a joining hole, and the lens further has a flexible snap-in element in the middle thereof for corresponding engagement with the join hole. In such a case, the lens can be easily and conveniently detachable from the frame by merely pressing the flexible snap-in element.

1 Claim, 7 Drawing Sheets

ASSEMBLY STRUCTURE FOR EYEGLASS LENS

BACKGROUND OF THE INVENTION

1. Fields of the Invention

The present invention relates to an assembly structure for eyeglass lens, especially to an one-piece structure of the eyeglass lens fitted into an eyeglass frame by flexibly engaging components for functions of easy assembling or disassembling thereof.

2. Descriptions of Related Art

At present, conventional eyeglasses are designed to enhance comfort for users in wearing thereof and to replace with any parts or components thereof in a convenient fashion. Therefore, manufacturers for eyeglasses have been dedicating to improve structures of eyeglasses used for various purposes by all means, and expect that users may feel much more comfortable in wearing eyeglasses and various practical functions to be included in eyeglasses.

Also, a pair of conventional eyeglasses commonly available in the market has only one semi-rimed frame at the upper thereof. The semi-rimed frame is combined with lenses by engagement of the upper edge on both sides of the lenses to the semi-rimed frame, but such a combination will easily result in detachment of the lens from the semi-rimed frame and further damages to the lens as dropping to the ground. Due to the above disadvantages, quite a few pairs of eyeglasses are developed to have a strengthened structure of the lens for stably fitting to eyeglasses frames, as further briefly specified below.

As referring to a Taiwan patent registration with an issue number M417563, issued on 1 Dec. 2011, an assembly for positioning eyeglasses lens is disclosed therein to comprise a single strip shaped frame, two temples separately slipped over two external sides of the frame in part and a one-piece lens. The frame further has a first engaging component in the middle thereof and two second engaging components separately formed at a predetermined position far from the first engaging component on each of the two external sides thereof. Each of the second engaging components is provided with a protruded portion on an outermost end thereof having a larger diameter than that of a portion connected to the frame, and the first engaging component is further provided with a holding portion in a radial configuration. The one-piece lens further has a first gap at the middle upper edge thereof for receipt of the first engaging component and two second gaps each at lateral upper edge thereof for receipt of each second engaging component. In such a case, the one-piece lens can be quickly disassembled for replacement as desired, and such an eyeglasses assembly can be made at a low cost.

As further referring to a Taiwan patent registration with an issue number M377605, issued on 1 Apr. 2011, it disclose a frame having a slot on a side thereof and an one-piece lens having a positioning part extended from one end thereof, in which the positioning part further has an engaging hole and the slot further has an engaging block. In this case, the lens can be quickly fixed and positioned in the frame by insertion of the positioning part into the slot and engagement of the engaging block of the slot into the engaging hole of the positioning part.

The combinations of an eyeglasses frame and lens as shown in the above prior arts all need the engaging components on all possible positions thereof to be aligned relatively for stable engagement thereof in the courses of disassembly and assembly, and even those engaging components need to be disassembled in sequence. In other words, it is much more complicated and difficult for users to disassemble or assemble lens from a frame in a pair of eyeglasses.

SUMMARY OF THE INVENTION

Therefore, an assembly structure for eyeglass lens is developed herein to improve the shortcoming that conventional assembly structures as aforesaid are not easy to disassemble, and to primarily allow eyeglass lens to be fitted into an eyeglass frame by flexibly engaging components for purposes of easy assembling or disassembling thereof.

In order to achieve the above objectives, an assembly structure for eyeglass lens in the present invention is designed to include a frame having a connection portion in the middle thereof from two sides of which two nose pads extend downwardly and obliquely in two opposite directions and eyeglasses lens. The connection portion further has a joining hole thereon, and the lens has a flexible snap-in element in the middle thereof for corresponding engagement with the join hole. Thus, the engagement of the flexible snap-in element into the joining hole can fix the lens well, and the lens can be simply detached by only slightly pressing the flexible snap-in element for easy and convenient disassembling effects in use thereof.

In the present invention, the flexible snap-in element is formed integrally in the middle of the lens.

In the present invention, the flexible snap-in element further has a clipping extension from each of two sides of the flexible snap-in element for correspondingly clipping in the center of the lens.

BRIEF DESCRIPTION OF THE DRAWINGS

The structure and the technical means adopted by the present invention to achieve the above and other objects can be best understood by refereeing to the following detailed description of the preferred embodiments and the accompanying drawings, wherein.

DETAILED DESCRIPTION OF THE PREFERRED EMBODIMENT

Figure 1:
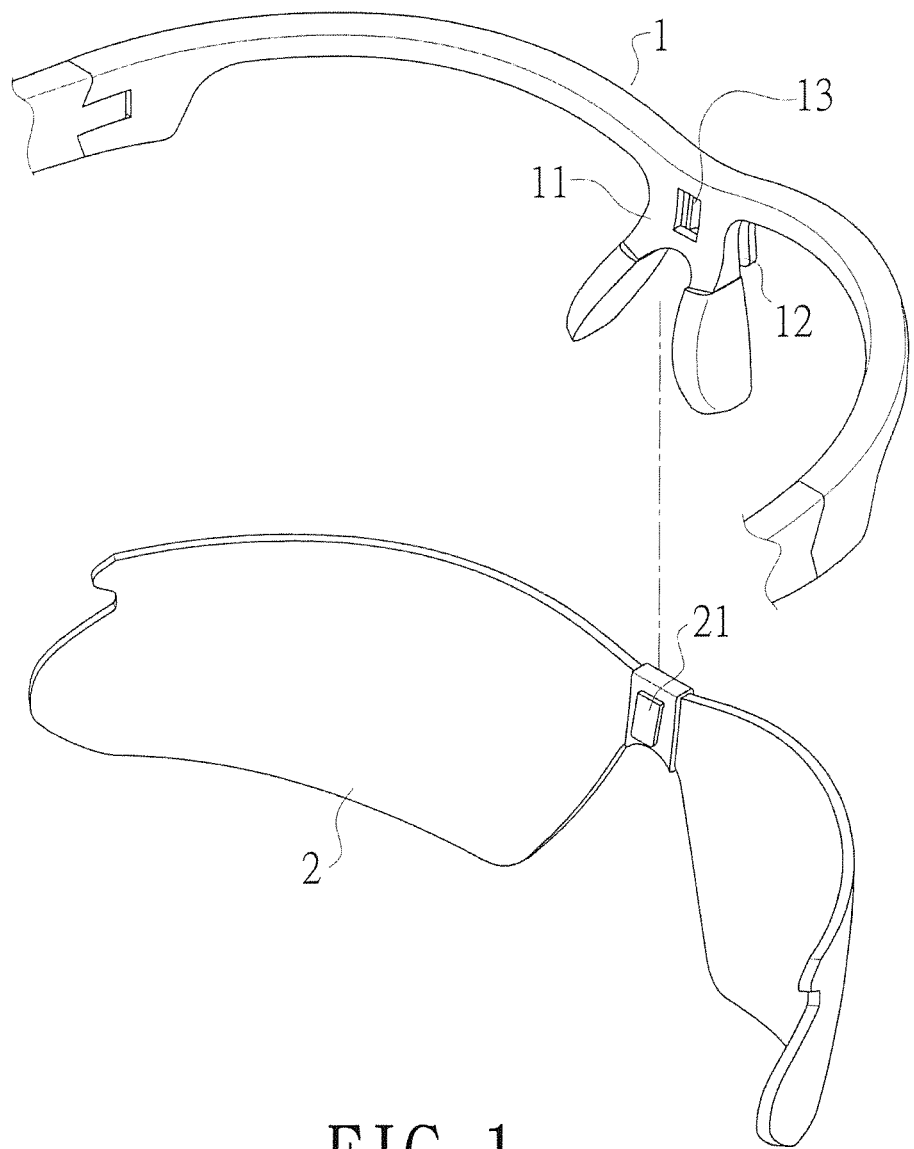
FIG. 1 is an exploded view showing the first embodiment of an assembly structure for an eyeglass lens according to the present invention.
Figure 2:
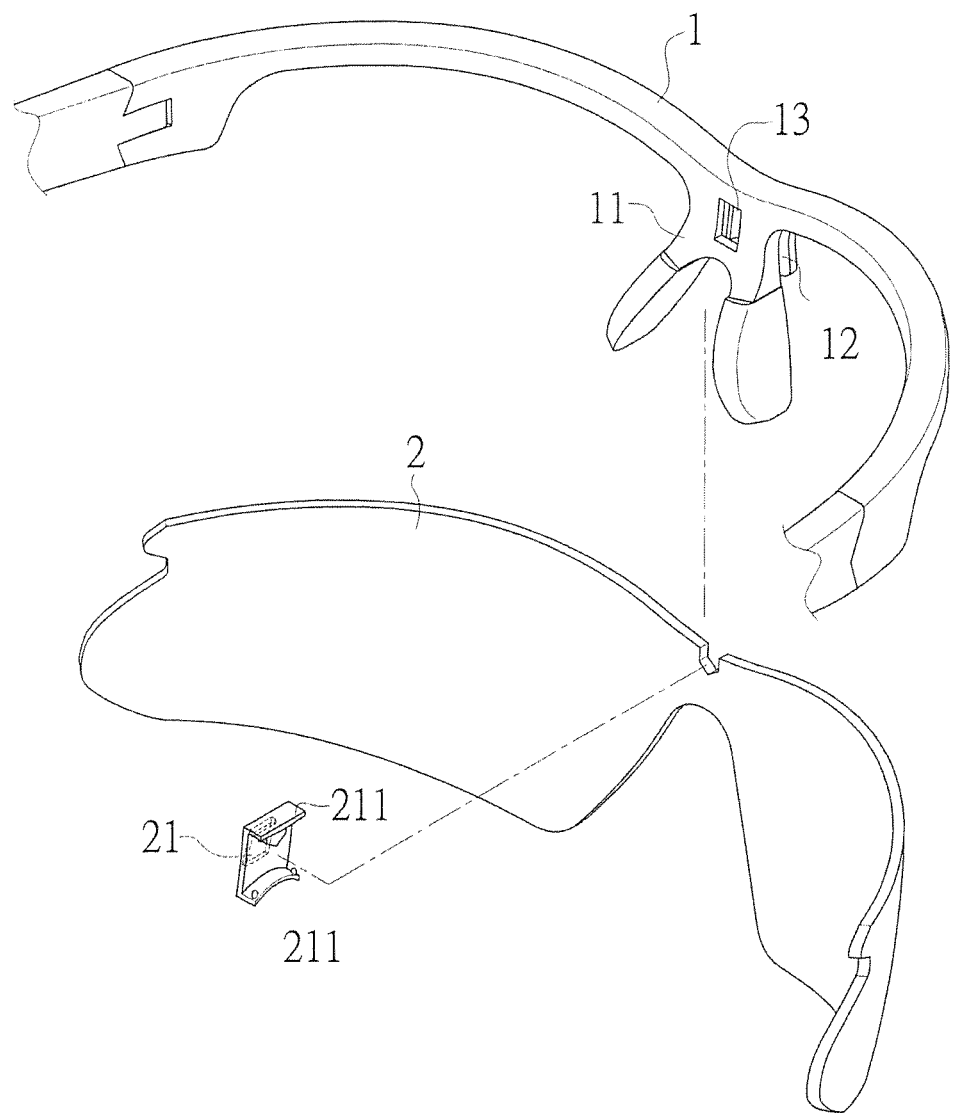
FIG. 2 is an exploded view showing the second embodiment of an assembly structure for an eyeglass lens according to the present invention.
Figure 3:
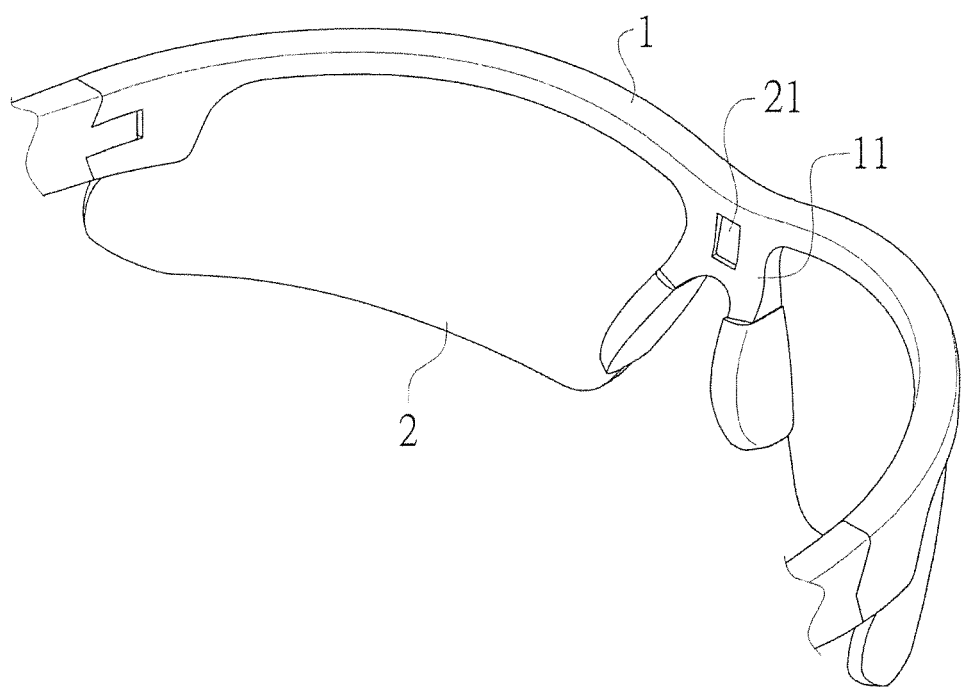
FIG. 3 is an assembled view showing an assembly structure for an eyeglass lens according to the present invention.
Figure 4:
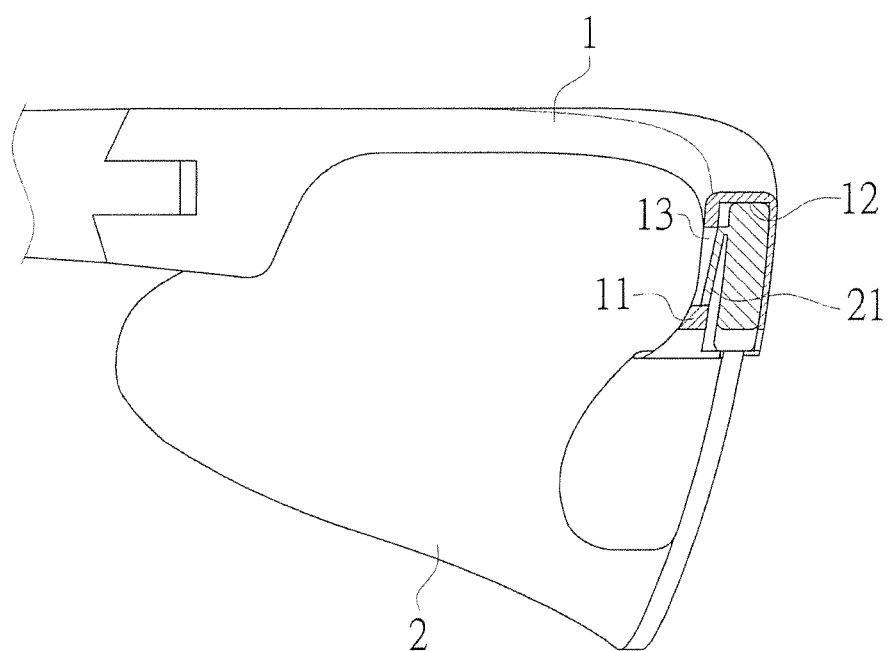
FIG. 4 is a side cross-sectional view showing the first embodiment of an assembly structure for an eyeglass lens in an assembled state according to the present invention.
Figure 5:
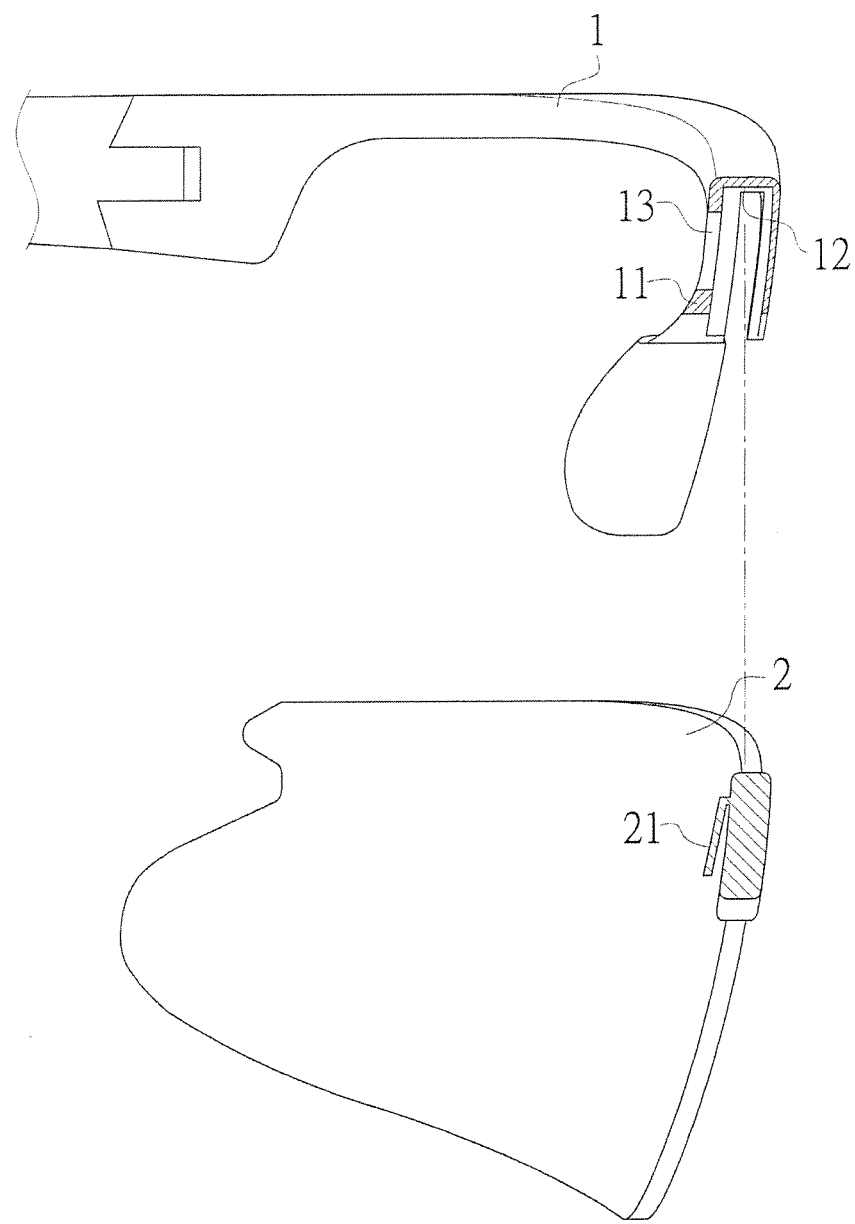
FIG. 5 is a side cross-sectional view showing the first embodiment of an assembly structure for an eyeglass lens in a disassembled state according to the present invention.
Figure 6:
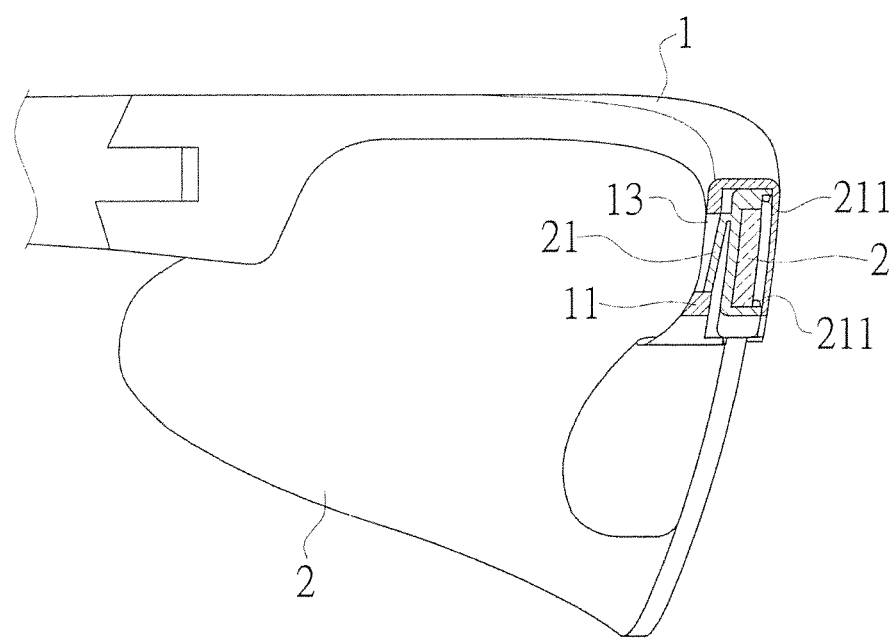
FIG. 6 is a side cross-sectional view showing the second embodiment of an assembly structure for an eyeglass lens in an assembled state according to the present invention.
Figure 7:
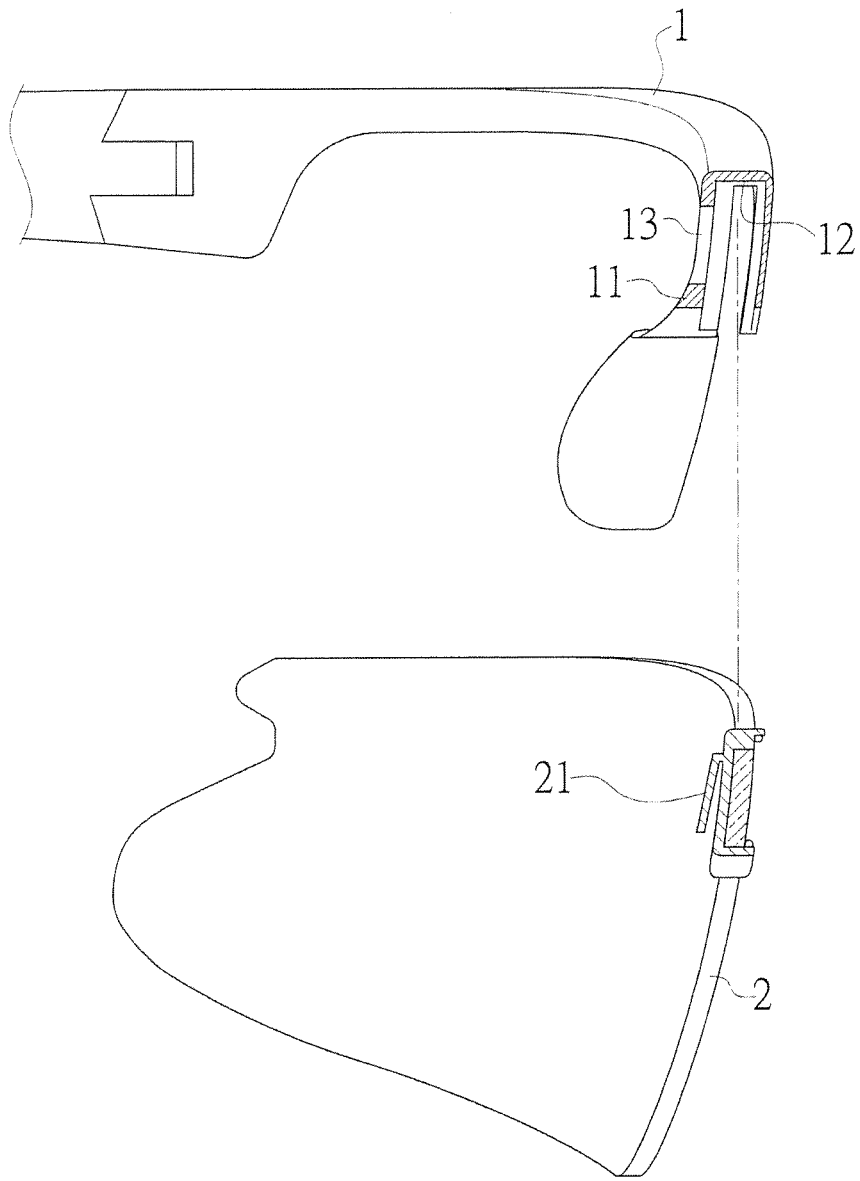
FIG. 7 is a side cross-sectional view showing the second embodiment of an assembly structure for an eyeglass lens in a disassembled state according to the present invention.

As referring to FIG. 1 to FIG. 3, they disclose an assembly structure for eyeglass lens comprising a one-piece lens (2) and a frame (1). The frame (1) has a connection portion (11) in the middle thereof from two sides of which two nose pads extend downwardly and obliquely in two opposite directions.

The connection portion (11) further has a clipping section (not shown), which defines a groove (12) for engagement of the lens (2) therein. The connection portion (11) further has a joining hole (13) thereon, and the lens (2) further has a flexible snap-in element (21) in the middle thereof for corresponding engagement with the join hole (13), wherein the flexible snap-in element (21) is formed integrally in the middle of the lens (2) and has a clipping extension (211) from each of two sides thereof for correspondingly clipping in the center of the lens (2);

Further speaking, the integral formation of the flexible snap-in element (21) in the middle of the lens (2) means that the flexible snap-in element (21) and the lens (2) can be connected together in the middle of the lens so as to make up a single complete piece or unit, or so as to work together as a single complete piece or unit, in such a way that the connection becomes part of, or is interconnected with, the piece or unit, as by means of interconnecting components, fasteners or the clipping extension (211) of the flexible component (21) as shown in FIG. 2.

As referring to FIG. 4 to FIG. 7, the lens (2) is correspondingly embedded in the groove (12) of the frame (1) in use thereof. When the connection portion (11) of the frame (1) is embedded in the center of the lens (2), the flexible snap-in element (21) is firstly compressed for insertion and then snapped the same in the joining hole (13). Therefore, the lens (2) can be steadily fixed on the frame (1).

As replacing or dismantling the lens (2), users may slightly press the flexible snap-in element (21), and pull the lens (2) out of the groove (12) of the frame (1) for the purpose of easy and convenient detachment of the lens (2).

While we have shown and described the embodiment in accordance with the present invention, it should be clear to those skilled in the art that further embodiments may be made without departing from the scope of the present invention.

In conclusion, an assembly structure for eyeglass lens according to the present invention has following advantages compared with techniques available now:

1. The assembly structure for eyeglass lens of the present invention uses a flexible component correspondingly embedded in the groove, and eyeglasses wearers only need to slightly push the lens into the groove to make the flexible component snapped in the joining hole of the to make the frame and lens steadily joined and positioned well.

2. As dismantling the lens from the frame in the present invention, eyeglasses wearers may slightly press the flexible component, and then pull the lens out of the groove of the frame for the effect of easy and convenient detachment of the lens.

What is claimed is:

1. An assembly structure for an eyeglass lens, comprising:
   a one-piece lens having a catch element disposed on a rear side of a substantially middle portion thereof, the catch element including a flexible snap-in element resiliently extending rearwardly from a portion of the catch element between opposing upper and lower ends of the catch element; and
   a frame having opposing front and rear sides and including a connection portion at a substantially middle portion thereof, wherein the connection portion has:
      a groove formed adjacent to the front side thereof for receiving the catch element therein; and
      a joining hole formed through the rear side of the frame at a location intermediate upper and lower edges of the frame in open communication with the groove for corresponding engagement with the flexible snap-in element to releasably retain the lens to the frame;
   wherein the catch element further has a clipping extension from each of two sides of the flexible component for correspondingly clipping at a substantially middle portion of the lens.

* * * * *